Patented Sept. 9, 1947

2,427,314

UNITED STATES PATENT OFFICE 2,427,314

ARYL GUANAMINES

Jack Theo Thurston, Cos Cob, Conn., assignor to American Cyanamid Company, New York, N. Y., a corporation of Maine No Drawing. Application August 30, 1941,
Serial No. 409,125

2 Claims. (Cl. 260—249.5)

The invention relates to a process for preparing 2-aryl-4,6-diamino-1,3,5-triazines which in the specification and claims will be referred to as aryl guanamines.

Several aryl guanamines such as benzoguanamine have been prepared in the past. The processes used, however, were expensive and the yields in some cases not satisfactory. The present invention is directed to a process of producing aryl guanamines by the reaction of a biguanide with an ester of the corresponding aromatic carboxylic acid. In the case of many of the aryl guanamines which can be prepared by the process of the present invention, the ester of the aromatic carboxylic acid is so active that it will react with the biguanide in the cold or without being heated to any very high temperature to give the corresponding guanamine in good yield, and it is an advantage of the present invention that many of the aryl guanamines can thus be prepared simply. However, in some cases, notably with N-substituted aryl guanamines, the reaction of the corresponding substituted biguanide with an ester of the aromatic carboxylic acid is somewhat too slow for practical use, and in such cases the reaction can be accelerated by the use of a strong base, such as a metal alkoxide, metal amide, or similar compounds capable of reacting with an alcohol to produce an alkoxide.

In general, it is desirable to carry out the reaction of the present invention in solution, and for this purpose alcohols are the preferred solvents, especially the lower monohydric paraffin alcohols such as methanol and ethanol. These alcohols are good solvents for biguanide and for most of the substituted biguanides, and they appear also to have some influence on the reaction. While the invention is not limited to the use of any particular alcohol as a solvent, I find that methanol gives excellent results, as does ethanol, and in some cases, the ethyl ether of ethylene glycol. For this reason and because of its cheapness, ready availability and easy recovery, methanol is the preferred solvent.

The aromatic carboxylic acid may be one in which the carboxyl group is attached to a nuclear carbon atom, or the carboxyl group may be present in a chain such as, for example, cinnamic acid or phenyl acetic acid. The esters of the nuclear carboxylic acids are, in general more reactive.

The particular ester of the carboxylic acid is not critical. In general, the reaction can be made to go with esters of any of the ordinary alcohols or phenols, but for the most part I prefer to use the esters of low molecular weight monohydric paraffin alcohols. These esters are highly reactive, give good yields, are cheap, and present the additional advantage that when an ester is employed, the alcohol group of which is the same as the alcohol used as the solvent, no additional recovery problem is presented. For this reason I prefer to use the lower monohydric alcohol esters, although the invention is not limited thereto, as other esters, even polyhydric esters, can be used.

The invention will be described in greater detail in conjunction with the following specific examples, which are typical illustrations of the invention. The parts are by weight.

Example 1

1-naphthoguanamine

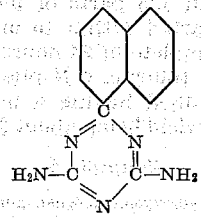

Eighteen parts of biguanide were dissolved in 80 parts of methanol, the solution was filtered, and 25 parts of ethyl 1-naphthoate added. After standing overnight, the guanamine had completely precipitated and was removed by filtration and recrystallized from a mixture of 90% of the ethyl ether of ethylene glycol and 10% water. The yield of the product in the form of small colorless needles melting at 276° C., was about 58%.

Example 2

3-hydroxy-2-naphthoguanamine

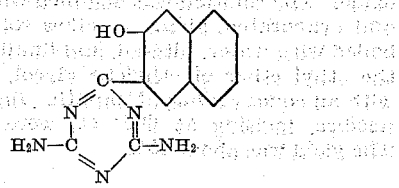

One hundred and forty parts of biguanide were dissolved in about 1500 parts of methanol and 304 parts of methyl 3-hydroxy-2-naphthoate were added, and the solution filtered. The guanamine began to precipitate within an hour and after standing overnight it was removed by filtration and recrystallized from hot n-butanol. The yield of product, which was in the form of bright canary yellow needles melting at 317° C., was about 70%.

Example 3

4-N-allylbenzoguanamine

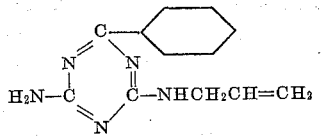

To 38 parts of allylbiguanide dissolved in 200 parts of methanol containing 6.5 parts of sodium metal was added 53.2 parts of methyl benzoate. After standing about two hours, the product began to precipitate and on further standing the reaction mixture set to a gelatinous solid. An equal volume of water was added and the product was cooled, in an ice-bath, in order to obtain complete crystallization. The 4-N-allylbenzoguanamine was filtered from solvent, washed with water and then dried. The yield of crude product melting at 114°–116° C. was almost quantitative and after recrystallization from alcohol it melted at 115–116° C.

Example 4

4-N-phenyl-benzoguanamine

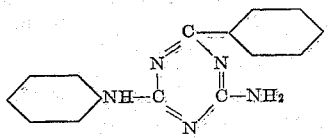

88.5 parts of phenyl biguanide dissolved in 200 parts of methanol containing 11.5 parts of sodium were mixed with 125 parts of methyl benzoate. Precipitation started within 15 minutes and was substantially complete in 24 hours. After recrystallization from toluene, 4-N-phenyl benzoguanamine was obtained having a melting point of 199–201° C., the yield being about 37%.

Example 5

2-hydroxycinnamoguanamine

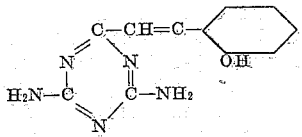

21.2 parts of biguanide were dissolved in 100 parts of methyl alcohol, the solution was filtered and then a solution of 29.2 parts of coumarin dissolved in 80 parts of methyl alcohol were added. Reaction took place slowly and was speeded up by the addition of a small amount of sodium methoxide. The solution was acidified with acetic acid and evaporated, giving a yellow solid which was boiled with water, filtered, and finally dissolved in the ethyl ether of ethylene glycol. On dilution with an equal volume of naphtha, fine light yellow needles, melting at 296° C., were precipitated. The yield was about 15%.

Example 6

4-N-β-oxydiethylene-benzoguanamine

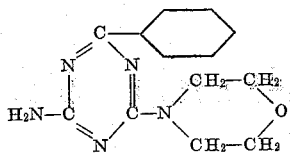

40 parts of N-biguanylmorpholine hydrochloride were mixed with 34 parts of methyl benzoate, using 10.7 parts of sodium in 200 parts of methanol both as a condensing and neutralizing agent. The sodium chloride formed in the neutralization of the N-biguanylmorpholine hydrochloride was filtered off and the filtrate allowed to stand for about a day. Gradual solidification took place. The small amount of liquid remaining was filtered off, producing about 56 parts of solid which was slurried with 100 parts of boiling water, then cooled to 20–25° C. and filtered. The product obtained melted at 142–143° C.

Example 7

Phenylacetoguanamine

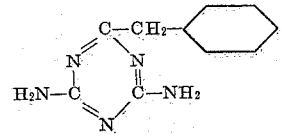

To 24 parts of biguanide dissolved in 160 parts of methanol was added 45 parts of ethyl phenylacetate. Product began to precipitate immediately and within an hour the reaction appeared to be complete. The product was removed by filtration and the yield of phenylacetoguanamine melting at 232–233° C. was 80%. After recrystallization from hot ethyl acetate and then from the ethyl ether of ethylene glycol, the purified phenylacetoguanamine melted at 237–238° C.

What I claim is:

1. A method of preparing a guanamine which comprises reacting a biguanide with an ester of an aromatic carboxylic acid in the presence of a metal alkoxide in stoichiometric proportions.

2. A method of preparing a guanamine which comprises reacting biguanide with an ester of an aromatic carboxylic acid in the presence of a metal alkoxide in stoichiometric proportions.

JACK THEO THURSTON.

REFERENCES CITED

The following references are of record in the file of this patent:

UNITED STATES PATENTS

| Number | Name | Date |
|---|---|---|
| 2,205,042 | Lenher | June 18, 1940 |
| 2,206,928 | Ulrich | June 9, 1940 |
| 2,094,608 | Kritchevsky | Oct. 5, 1937 |

OTHER REFERENCES

Berichte de D. Chemie Ges., vol. 25, pp. 536–40.
Annalen, vol. 376, pp. 180 and 181.